(12) United States Patent
Zhao et al.

(10) Patent No.: US 9,586,191 B2
(45) Date of Patent: Mar. 7, 2017

(54) MAGNETIC CORE COATED INORGANIC ION ADSORBENT FOR REMOVING CS IONS IN RADIOACTIVE WASTEWATER AND PREPARATION METHOD THEREOF

(71) Applicants: Xuan Zhao, Beijing (CN); Jiying Wei, Beijing (CN); Fuzhi Li, Beijing (CN)

(72) Inventors: Xuan Zhao, Beijing (CN); Jiying Wei, Beijing (CN); Fuzhi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 116 days.

(21) Appl. No.: 14/428,437

(22) PCT Filed: Sep. 18, 2013

(86) PCT No.: PCT/CN2013/083734
§ 371 (c)(1),
(2) Date: Mar. 16, 2015

(87) PCT Pub. No.: WO2014/044182
PCT Pub. Date: Mar. 27, 2014

(65) Prior Publication Data
US 2015/0231598 A1   Aug. 20, 2015

(30) Foreign Application Priority Data

Sep. 19, 2012   (CN) .......................... 2012 1 0347269

(51) Int. Cl.
*B01J 23/00*   (2006.01)
*B01J 20/02*   (2006.01)
(Continued)

(52) U.S. Cl.
CPC .......... *B01J 20/0229* (2013.01); *B01J 20/06* (2013.01); *B01J 20/103* (2013.01);
(Continued)

(58) Field of Classification Search
CPC .............. B01J 20/0229; B01J 20/28009; B01J 20/3236; B01J 20/103; B01J 20/3204;
(Continued)

(56) References Cited

FOREIGN PATENT DOCUMENTS

CN       1319849 A    10/2001
CN     101721971 A     6/2010
(Continued)

OTHER PUBLICATIONS

Machine Translation of RU2313147 (C1)—Dec. 20, 2007.*
Machine Translation of CN102623125A—Aug. 1, 2012.*

*Primary Examiner* — Colleen Dunn
*Assistant Examiner* — Haytham Soliman
(74) *Attorney, Agent, or Firm* — AKC Patents LLC; Aliki K. Collins

(57) ABSTRACT

The invention discloses a micron-grade magnetic core coated ferrocyanide adsorbent for removing Cs ions in radioactive wastewater and a preparation method thereof. The adsorbent takes magnetic $Fe_3O_4$ as a core, the surface is coated with a dense $SiO_2$ single layer serving as a protective layer, and an active component is metal ion stabilized potassium ferrocyanide coated on the outer layer, wherein stabilized metal ions comprise Ti, Zn, Cu, Ni, Co, and Zr. The particle size of the adsorbent is 0.2-5 μm, the adsorbent in the outermost layer is conductive to improving the adsorption efficiency for $Cs^+$ ions, and an external magnetic field is adopted for realizing solid-liquid phase separation. The preparation method comprises the following steps: coating a hydrated metal oxide of Ti, Zr or Co, Ni, Cu or Zn on the surface of $Fe_3O_4SiO_2$ to form a composite magnetic material, wherein the hydrated oxide performs hydroxyl polymerization reaction with the surface of $SiO_2$ to produce M—O—Si bonds to improve the bonding strength between M and the surface of $SiO_2$; and finally reacting the composite magnetic material with a potassium ferrocyanide (Continued)

solution to form the required composite adsorbent, wherein the metal ions M achieve the effects of stabilizing the ferrocyanide and also achieve a bridge effect for bonding the ferrocyanide and the composite magnetic material together.

10 Claims, 3 Drawing Sheets

(51) Int. Cl.
| | | |
|---|---|---|
| *B01J 20/28* | (2006.01) | |
| *B01J 20/10* | (2006.01) | |
| *B01J 20/06* | (2006.01) | |
| *B01J 20/32* | (2006.01) | |
| *C02F 1/28* | (2006.01) | |
| *C02F 101/20* | (2006.01) | |
| *C02F 103/34* | (2006.01) | |

(52) U.S. Cl.
CPC ... *B01J 20/28004* (2013.01); *B01J 20/28009* (2013.01); *B01J 20/3204* (2013.01); *B01J 20/3236* (2013.01); *B01J 20/3293* (2013.01); *C02F 1/281* (2013.01); *C02F 1/288* (2013.01); *C02F 2101/20* (2013.01); *C02F 2103/34* (2013.01)

(58) Field of Classification Search
CPC .. B01J 20/3293; B01J 20/28004; B01J 20/06; C02F 1/281; C02F 1/288; C02F 2101/20; C02F 2103/34
USPC ........................................................ 502/325
See application file for complete search history.

(56) References Cited

FOREIGN PATENT DOCUMENTS

| | | |
|---|---|---|
| CN | 102188957 A | 9/2011 |
| CN | 102623125 A | 8/2012 |
| CN | 102836693 A | 12/2012 |
| RU | 2313147 C1 | 12/2007 |

\* cited by examiner

MAGNETIC CORE COATED INORGANIC ION ADSORBENT FOR REMOVING CS IONS IN RADIOACTIVE WASTEWATER AND PREPARATION METHOD THEREOF

TECHNICAL FIELD

The invention relates to an inorganic ion adsorbent for removing Cs ions in radioactive wastewater and a preparation method thereof, in particular to a preparation method of a composite adsorbent, which takes magnetic $Fe_3O_4$ as a core, the surface of which is coated with a dense $SiO_2$ single layer serving as a protective layer, and an active component of which is metal ion stabilized potassium ferrocyanide coated on the outermost layer, wherein stabilized metal ions comprise Ti(VI), Zn(II), Cu(II), Ni(II), Co(II), Zr(VI) and the like. The invention belongs to the technical fields of preparation of inorganic materials and treatment of radioactive wastewater.

BACKGROUND ART

Low-level radioactive wastewater treatment in the field of nuclear industry in China always adopts a traditional three-stage treatment process, namely flocculation and sedimentation-evaporation-ion exchange. In recent years, a membrane technology is gradually applied in the field of low-level radioactive wastewater treatment and shows a tendency to replace the traditional process. The membrane technology has a wide treatment range and can sequentially remove particulate matters, colloids, organic matters and other impurities in water, and remove most of salts and radionuclides, thereby enabling the radioactivity of outlet water to achieve a relatively low level. Utilizing an inorganic adsorbent to remove nuclides is also a method for low-level radioactive wastewater treatment. The inorganic adsorbent has high selectivity for trace nuclide ions and high decontamination efficiency, can selectively adsorb the trace nuclide ions from radioactive wastewater with high salinity, and is suitable for treatment of the discontinuously produced disperse radioactive wastewater with single type of nuclides. In addition, the inorganic adsorbent has properties of good thermal stability and chemical stability and strong radiation resistance, and a saturated inorganic material has high stability in long-term geological storage and is easy to treat and dispose.

Main radioactive substances contained in the radioactive wastewater generated under operation and accident conditions of a nuclear power plant comprise long-lived fission products $^{134}Cs/^{137}Cs$ and the like with β radioactivity. A metal ion (Ti, Co, Cu, Zn, Ni, Zr and the like) stabilized ferrocyanide can efficiently and selectively adsorb Cs ions from the low-level radioactive wastewater with high salinity within the pH range of 1-13, and the distribution coefficient of the Cs ions can reach $10^4$-$10^6$ (Nuclear Science and Engineering, 137, 206-214, 2001).

The particle of power ferrocyanide has small size, it is difficult in solid-liquid phase separation and is difficult to be directly applied to the radioactive wastewater treatment. Aiming at this problem, domestic and foreign counterparts generally adopt formed silicon dioxide as an immobilizing carrier to load the ferrocyanide (Separation and Purification Technology 16, 147-158, 1999) or combine the ferrocyanide with PAN to prepare inorganicorganic hybrid small balls (Chinese patent CN1319849A). The particle size of the adsorbent prepared according to the above methods is millimeter grade mostly, the mechanical properties of the adsorbent are improved, and the adsorbent can be used for loading a fixed bed, but the reaction efficiency and the adsorption capacity are reduced. This is because that, in the adsorption process occurring on an inorganic adsorbentsolution interface, the adsorption rate depends on two processes, namely the diffusion process from the solution to an interface layer and the internal diffusion process of the adsorbent particles, and the adsorption rate is inversely proportional to r (r is the radius of the particles) and $r^2$ respectively, so that increasing the particle size is often at the expense of adsorption mass transfer kinetics. In addition, increasing the particles of the ferrocyanide can result in incomplete utilization of the adsorbent in an inner layer (Nuclear and Radiochemistry, 23, 108-113, 2001).

Invention Contents

The invention designs and develops a magnetic composite adsorbent with a core-shell structure with respect to the problem of difficult solid-liquid phase separation caused by direct application of ferrocyanide powder and the problems of large particle size, low adsorption capacity and poor mass transfer condition of a composite adsorbent in an existing immobilization technology, and the magnetic composite adsorbent takes a composite magnetic carrier $Fe_3O_4$ coated with a single layer $SiO_2$ on the surface as a base to construct a micron grade magnetic core coated with ferrocyanide composite adsorbent. The adsorbent has a multi-layer structure and is characterized in that a core of the adsorbent is magnetic $Fe_3O_4$ nanoparticles, the particle size range is 10-60 nm and the specific saturation magnetization is more than 75 emu/g; the $SiO_2$ dense single layer is coated on the surface of the magnetic core $Fe_3O_4$ to achieve the effects of stabilizing the magnetism of the material and improving the acid and alkali resistance of the material; a hydrated metal oxide $MO_x \cdot H_2O$ (M=Ti, Co, Cu, Ni, Zn and Zr) single layer is coated on the surface of $Fe_3O_4/SiO_2$ to serve as a transition layer; stabilized metal ions M in the transition layer react with a potassium ferrocyanide solution to form $Fe_3O_4/SiO_2/K_{4-y}M_x[Fe(CN)_6]$, thereby coating active components of the adsorbent on the outermost layer of the material.

According to the invention, the metal ion stabilized ferrocyanide adsorption material is coated on the surface of the $Fe_3O_4$ magnetic core to construct the micron dimension magnetic composite adsorbent, so that the particle size of the adsorbent can be greatly reduced, the specific surface area is increased and the adsorption efficiency and adsorption capacity for Cs ions are further improved. In addition, by pre-arranging the magnetic material in the adsorbent, and an external magnetic field is utilized during working, so that solid-liquid phase separation and recovery of the adsorbent can be fast realized, and the problem of difficult solid-liquid phase separation caused by reducing the size of the adsorbent is further avoided.

The technical scheme of the invention is as follows:

1. Prepare a hydrated metal oxide transition layer on the surface of $Fe_3O_4/SiO_2$ 1) Prepare a hydrated titanium oxide and zirconium oxide transition layer by a sol-gel method a) Dissolve tetrabutyl titanate in isopropanol, and control the volume ratio of the tetrabutyl titanate to the isopropanol at 0.005:1-0.05:1 to form a solution A1 for later use. Dissolve zirconium isopropoxide in isopropanol, and control the volume ratio of the zirconium isopropoxide to the isopropanol at 0.01:1-0.1:1 to form a solution A2 for later use. Mix isopropanol with ultra-pure water having resistivity of not less than 16 MΩ·cm to form a solution B for later use, wherein the volume ratio of the isopropanol to the water is 5:1-2:1.

b) Add a composite magnetic carrier $Fe_3O_4/SiO_2$ coated with a dense single layer $SiO_2$ on the surface into the solution B, perform ultrasonic dispersion for 30 min, then add concentrated ammonia water, and uniformly stir by using a polytetrafluoroethylene stirrer. Control the concentration by mass-to-volume ratio of the $Fe_3O_4/SiO_2$ to the solution B within the range of 0.005-0.02 g/mL and the volume ratio of the concentrated ammonia water to the solution B within the range of 0.02:1-0.05:1.

c) Slowly drop the solution A1 into the reaction system at room temperature, control the amount of tetrabutyl titanate added into per gram of $Fe_3O_4/SiO_2$ at 2.0-3.0 mL, and perform stirring reaction at room temperature for 4-6 h after dropping. Separate an obtained precipitate by using an external magnetic field, wash with anhydrous ethanol, and dry in a vacuum oven at 60-80° C. for 10-12 h to obtain a composite magnetic material $Fe_3O_4/SiO_2/TiO_2.H_2O$ with the surface $TiO_2$ coating amount of 50-55 wt %, wherein the specific saturation magnetization is more than 40 emu/g.

d) Under the same operation conditions, slowly drop the solution A2 into the reaction system, control the amount of zirconium isopropoxide added into per gram of $Fe_3O_4/SiO_2$ at 1.5-2.5 mL, and perform stirring reaction at room temperature for 4-6 h after dropping. Separate an obtained precipitate by using an external magnetic field, wash with anhydrous ethanol, and dry in a vacuum oven at 60-80° C. for 10-12 h to obtain a composite magnetic material $Fe_3O_4/SiO_2/ZrO_2.H_2O$ with the surface $ZrO_2$ coating amount of 40-50 wt %, wherein the specific saturation magnetization is more than 40 emu/g.

2) Prepare a hydrated copper oxide, zinc oxide, nickel oxide and cobalt oxide transition layer by adopting a surface deposition precipitation method a) Dissolve soluble sulfates, acetates, nitrates or chlorides of $Co^{2+}$, $Ni^{2+}$, $Cu^{2+}$ and $Zn^{2+}$ in 100 mL of anhydrous ethanol or isopropanol to form solutions $C_{-Co}$, $C_{-Ni}$, $C_{-Cu}$ and $C_{-Zn}$, wherein the molar concentration of ions in each solution is controlled within the range of 0.04-0.06 mol/L.

b) Add the composite magnetic carrier $Fe_3O_4SiO_2$ coated with the dense single layer $SiO_2$ on the surface into the prepared solution, and perform ultrasonic dispersion for 30 min, wherein the concentration by mass-to-volume ratio of the $Fe_3O_4SiO_2$ is controlled within the range of 0.005-0.015 g/mL.

c) Slowly drop a 0.02-0.05 mol/L NaOH water solution into the reaction system at room temperature, uniformly stir by using the polytetrafluoroethylene stirrer, and control the endpoint pHs of the ions as follows respectively: Zn: 6.5-8; Cu: 7-9 and NiCo: 10-12. Age the reaction system for 2-4 h at room temperature, then separate by using the external magnetic field, firstly wash with ultra-pure water till the pH is neutral, further wash with anhydrous ethanol, and dry in the vacuum oven at 60-80° C. for 10-12 h to obtain $Fe_3O_4SiO_2MO.H_2O$ (M=Co, Ni, Cu or Zn) with the surface coating amount of 40-50 wt %, wherein the specific saturation magnetization is more than 40 emu/g.

2. Prepare a ferrocyanide adsorbent

Soak the prepared $Fe_3O_4/SiO_2/MOx.H_2O$ (M=Ti, Zr, Zn, Cu, Ni and Co) in a hydrochloric acid solution of potassium ferrocyanide, wherein the concentration of the potassium ferrocyanide is 0.5-1.5 mol/L, the concentration of the hydrochloric acid is 1.0-2.0 mol/L, and the concentration by mass-to-volume ratio of the $Fe_3O_4/SiO_2/MOx.H_2O$ is 0.01-0.03 g/mL. React the system at room temperature, and stir for 30 min every 2-4 h. Separate the precipitate by using the external magnetic field after reacting for 20-24 h, fully wash the precipitate with ultra-pure water till flushing liquid is colorless, further wash with anhydrous ethanol, and dry the sample in the vacuum oven at 60-80° C. for 10-12 h to obtain the black and blue magnetic core coated composite adsorbent.

3. The composite carrier $Fe_3O_4/SiO_2$ adopted in the step 1 has the following characteristics:

The particle size of the magnetic core $Fe_3O_4$ is 10-60 nm, the specific saturation magnetization is more than 75 emu/g, and the content of organic matters is lower than 1%. The specific saturation magnetization of the composite carrier $Fe_3O_4/SiO_2$ is more than 70 emu/g, and the oxidation resistance and the acid and alkali resistance are good.

4. The $Fe_3O_4/SiO_2K_{4-y}M_x[Fe(CN)_6]$ composite adsorbent prepared in the step 2 has the following characteristics:

The particle size range of the sample is 0.2-5 μm, the specific saturation magnetization is 3-10 emu/g, and when the initial concentration of $Cs^+$ in radioactive wastewater is 1-10 mg/L and competing ions $H^+$, $Na^+$ and $K^+$ (the concentration is 0.1-1.0 mol/L) exist, the adsorption distribution coefficient $K_d$ of the composite adsorbent for $Cs^+$ is $10^4$-$10^7$ mL/g, and the adsorption selectivity coefficients for $Cs^+$ are as follows respectively: $Ks_{Cs/H}=10^3$-$10^6$, $Ks_{Cs/Na}=10^3$-$10^5$ and $Ks_{Cs/K}=10^3$-$10^4$.

5. The stirrer adopted in all the steps is made of polytetrafluoroethylene, thereby being capable of preventing magnetic substances from adhering to the surface of the stirrer and preventing the phenomena of non-uniform dispersion of particles and non-uniform growth of a coating layer.

The invention has the following beneficial effects:

The magnetic core coated ferrocyanide composite adsorbent researched by the invention has the following structural characteristics: 1. the adsorbent takes $Fe_3O_4$ nanoparticles as the core, in order to ensure the magnetic separation effect of the composite adsorbent during the use, it is required that the specific saturation magnetization of $Fe_3O_4$ is more than 75 emu/g; 2. the $SiO_2$ dense layer is coated on the surface of $Fe_3O_4$, so that the adsorbent can achieve the effects of inhibiting oxidation of the magnetic core material, stabilizing the magnetism of the material and improving the acid and alkali resistance of the material; 3. the hydrated oxide single layer of Ti, Co, Cu, Ni, Zn or Zr is coated on the surface of $Fe_3O_4/SiO_2$, and such hydrated oxide can perform hydroxyl polymerization reaction with the surface of $SiO_2$ to produce M—O—Si bonds, so that the metal ions can firmly grow on the surface of $SiO_2$; and 4. the composite magnetic material $Fe_3O_4/SiO_2/MO_x.H_2O$ reacts with the potassium ferrocyanide solution to form $Fe_3O_4/SiO_2/K_{4-y}M_x[Fe(CN)_6]$. The metal ions M stabilize the ferrocyanide, achieve a bridge effect for bonding the ferrocyanide and the composite carrier together and further improve the bonding strength of the composite adsorbent. In addition, the ferrocyanide is in the outermost layer of the composite adsorbent, thereby being conductive to improving the effective utilization rate of the adsorbent.

The schematic diagram of the structure of the magnetic core coated adsorbent is as shown in FIG. 1. TEM, SEM and VSM determination results show that the particle size of the composite adsorbent is 0.2-5.0 μm, the specific saturation magnetization is 3-10 emu/g, and the magnetic separation effect in the external magnetic field is good. The determination of the adsorption performance for $Cs^+$ shows that the adsorption speed of the adsorbent for $Cs^+$ is fast, and when the initial concentration of $Cs^+$ is 1-10 mg/L and the competing ions $H^+$, $Na^{30}$ and $K^+$ (the concentration is 0.1-1.0 mol/L) exist, the adsorption distribution coefficient $K_d$ of the composite adsorbent for $Cs^+$ is $10^4$-$10^7$ mL/g, and the adsorption selectivity coefficients for $Cs^+$ are as follows respectively: $Ks_{Cs/H}=10^3$-$10^6$, $Ks_{Cs/Na}=10^3$-$10^5$ and $Ks_{Cs/K}=10^3$-$10^4$. In addition, in the whole preparation process, no organic template is adopted, the composite adsorbent has no residues of organic matters, and the stability of the material in the use process is improved.

DETAILED DESCRIPTION

Embodiment 1: Preparation of Magnetic Core Coated Titanium Potassium Ferrocyanide A hydrated $TiO_2$ coating layer is prepared on the surface of a composite magnetic carrier $Fe_3O_4/SiO_2$ by using a sol-gel method, and then a Ti ion stabilized potassium ferrocyanide adsorbent is prepared. The details of steps are as follows:

1) Dissolve 2.0-2.5 mL of tetrabutyl titanate in 100 mL of isopropanol to form a solution A for later use; and mix 80 mL of isopropanol with 40 mL of ultra-pure water (the resistivity is not less than 16 MΩ·cm) to form a solution B for later use. Add 1.0 g of composite magnetic carrier $Fe_3O_4/SiO_2$ coated with a dense single layer $SiO_2$ on the surface into the solution B, perform ultrasonic dispersion for 30 min, then add 3 mL of concentrated ammonia water, and uniformly stir by using a polytetrafluoroethylene stirrer. Slowly drop the solution A into the reaction system at room temperature, and perform stirring reaction at room temperature for 5 h after dropping. Separate an obtained precipitate by using an external magnetic field, wash with anhydrous ethanol for 3-4 times, and dry in a vacuum oven at 80° C. for 10 h to obtain a composite magnetic material $Fe_3O_4/SiO_2/TiO_2 \cdot H_2O$ with the surface $TiO_2$ coating amount of 55 wt %, wherein the specific saturation magnetization is 42.5 emu/g.

Figure 1:
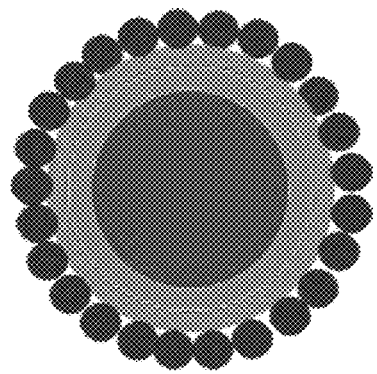
FIG. 1 is a schematic diagram of the structure of a magnetic core coated ferrocyanide cerium removal adsorbent.
Figure 2:
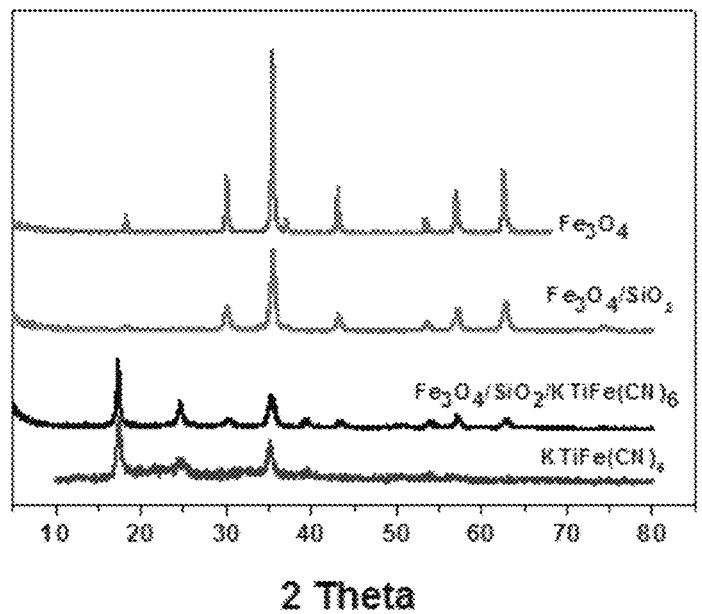
FIG. 2 is an XRD diagram of magnetic core coated titanium potassium ferrocyanide.
Figure 3:
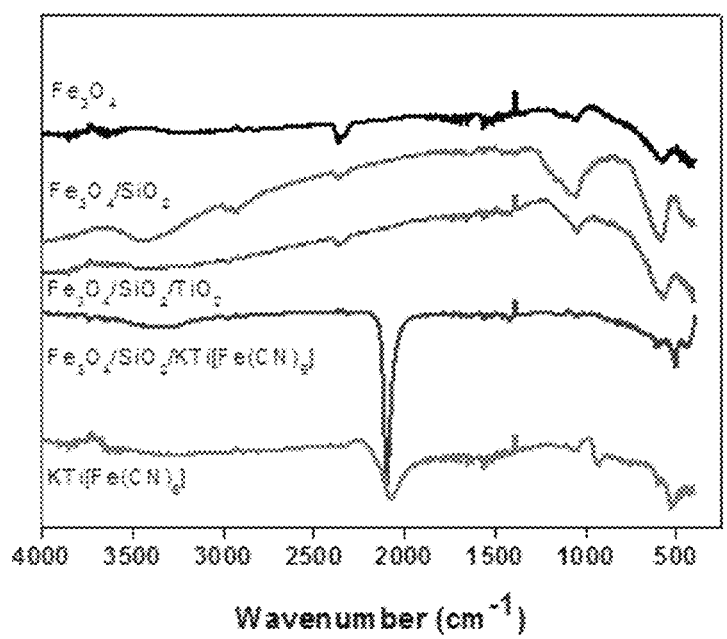
FIG. 3 is an FT-IR diagram of magnetic core coated titanium potassium ferrocyanide.
Figure 4:
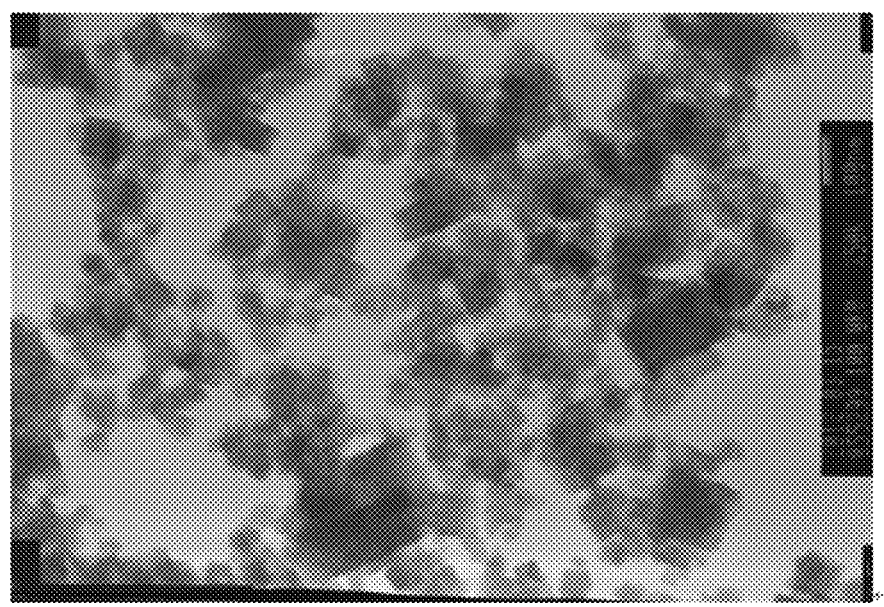
FIG. 4 is a TEM diagram of magnetic core coated titanium potassium ferrocyanide.
Figure 5:
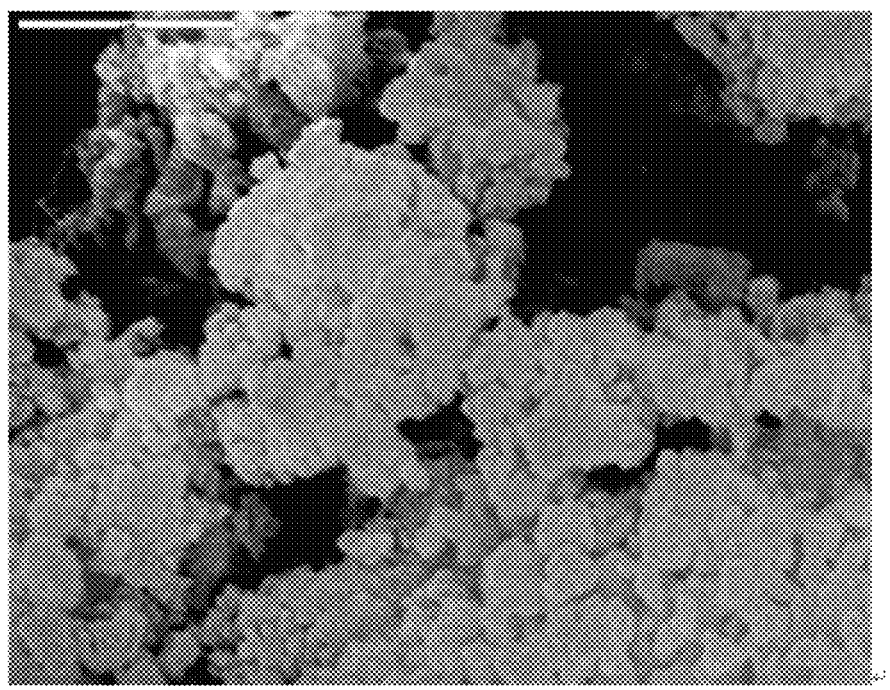
FIG. 5 is an SEM diagram of magnetic core coated titanium potassium ferrocyanide.

2) Soak 1.0 g of $Fe_3O_4/SiO_2/TiO_2 \cdot H_2O$ composite magnetic material in 50-100 mL of hydrochloric acid solution of potassium ferrocyanide, wherein the concentration of the potassium ferrocyanide is 0.5-1.0 mol/L, and the concentration of the HCl is 1.0 mol/L. React the system at room temperature, stir for 30 min by using the polytetrafluoroethylene stirrer every three hours, and separate the precipitate by using the external magnetic field after reacting for 20-24 h. Fully wash the precipitate with ultra-pure water till washing liquid is colorless, further wash with anhydrous ethanol, and dry the sample in the vacuum oven at 60-80° C. for 10-12 h to obtain the black and blue $Fe_3O_4SiO_2K_{4-y}Ti_x[Fe(CN)_6]$ composite adsorbent, wherein XRD and FT-IR results are as shown in FIGS. 2 and 3. The TEM determination results are as shown in FIG. 4, the independent sample particle is cubic, and the particle size range is 50-200 nm; the SEM determination results are as shown in FIG. 5, and the particles are aggregated to become an aggregate with the size of about 1.0-4.0 μm; and the specific saturation magnetization of the material is 6.2 emu/g respectively according to VSM determination. When the initial concentration of $Cs^+$ ions in radioactive wastewater is 1-10 mg/L and the concentrations of competing ions $H^+$, $Na^+$ and $K^+$ are 0.1-1.0 mol/L, the adsorption distribution coefficient $K_d$ of the composite adsorbent for $Cs^+$ is $10^4$-$10^7$ mL/g and the adsorption selectivity coefficients for $Cs^+$ are as follows respectively: $Ks_{Cs/H}=10^3$-$10^6$, $Ks_{Cs/Na}=10^3$-$10^5$ and $Ks_{Cs/K}=10^3$-$10^4$.

Embodiment 2: Preparation of Magnetic Core Coated Zirconium Potassium Ferrocyanide A hydrated $ZrO_2$ coating layer is prepared on the surface of a composite magnetic carrier $Fe_3O_4SiO_2$ by using a sol-gel method, and then a Zr ion stabilized potassium ferrocyanide adsorbent is prepared. The details of steps are as follows:

1) Dissolve 1.5 mL-2.0 mL of zirconium isopropoxide in 100 mL of isopropanol to form a solution A for later use; and mix 80 mL of isopropanol with 20 mL of ultra-pure water (the resistivity is not less than 16 MΩ·cm) to form a solution B for later use. Add 1.0 g of composite magnetic carrier $Fe_3O_4/SiO_2$ coated with a dense single layer $SiO_2$ on the surface into the solution B, perform ultrasonic dispersion for 30 min, then add 2-3 mL of concentrated ammonia water, and uniformly stir by using a polytetrafluoroethylene stirrer. Slowly drop the solution A into the reaction system at room temperature, and perform stirring reaction at room temperature for 5 h after dropping. Separate an obtained precipitate by using an external magnetic field, wash with anhydrous ethanol for 3-4 times, and dry in a vacuum oven at 80° C. for 10 h to obtain a composite magnetic material $Fe_3O_4/SiO_2/ZrO_2 \cdot H_2O$ with the surface $ZrO_2$ coating amount of 54.2 wt %, wherein the specific saturation magnetization is 44.6 emu/g.

2) Soak 1 g of $Fe_3O_4/SiO_2/ZrO_2 \cdot H_2O$ composite magnetic material in 50-100 mL of hydrochloric acid solution of potassium ferrocyanide, wherein the concentration of the potassium ferrocyanide is 0.5-1.0 mol/L, and the concentration of the HCl is 1.0 mol/L. React the system at room temperature, stir for 30 min by using the polytetrafluoroethylene stirrer every three hours, separate the precipitate by using the external magnetic field after reacting for 24 h, fully wash the precipitate with ultra-pure water till flushing liquid is colorless, further wash with anhydrous ethanol for 2-3 times, and dry the sample in the vacuum oven at 60-80° C. for 10 h to obtain the black and blue $Fe_3O_4/SiO_2K_{4-y}Zr_x[Fe(CN)_6]$ composite adsorbent, wherein the particle size after aggregation is 1.0-5.0 μm according to SEM determination; and when the initial concentration of $Cs^+$ ions in radioactive wastewater is 1-10 mg/L, the adsorption distribution coefficient $K_d$ of the composite adsorbent for $Cs^+$ ions within 1 h reaches $10^4$-$10^7$ mL/g.

Embodiment 3: Preparation of Magnetic Core Coated Zinc Potassium Ferrocyanide

A hydrated ZnO coating layer is prepared on the surface of $Fe_3O_4/SiO_2$ by using a deposition precipitation method, and then a Zn ion stabilized potassium ferrocyanide adsorbent is prepared. The details of steps are as follows:

1) Dissolve $ZnSO_4$, $Zn(CH_3COO)_2$, $Zn(NO_3)_2$ or $ZnCl_2$ in 100 mL of anhydrous ethanol or isopropanol to enable the concentration of $Zn^{2+}$ to be 0.06 mol/L. Add 1.0 g of composite magnetic carrier $Fe_3O_4/SiO_2$, and perform ultrasonic dispersion for 30 min. Slowly drop a 0.02-0.05 mol/L NaOH water solution into the reaction system at room temperature, and uniformly stir by using a polytetrafluoroethylene stirrer till the endpoint pH is 6.5-8. Age at room temperature for 2-4 h, then separate a precipitate by using an external magnetic field, firstly wash with ultra-pure water till the pH is neutral, further wash with anhydrous ethanol for 3-4 times, and dry in a vacuum oven at 80° C. for 10 h to obtain a composite magnetic material $Fe_3O_4/SiO_2/ZnO \cdot H_2O$ with the ZnO coating amount of 48.6 wt %, wherein the specific saturation magnetization is 42.8 emu/g.

2) Soak 1.0 g of $Fe_3O_4/SiO_2/ZnO \cdot H_2O$ composite magnetic material in 50-100 mL of hydrochloric acid solution of potassium ferrocyanide, wherein the concentration of the potassium ferrocyanide is 0.5-1 mol/L and the concentration of the HCl is 1 mol/L. React the system at room temperature, stir for 30 min by using the polytetrafluoroethylene stirrer every three hours, separate the precipitate by using the external magnetic field after reacting for 24 h, fully wash the precipitate with ultra-pure water till washing liquid is colorless, further wash with anhydrous ethanol for 2-3 times, and dry the sample in the vacuum oven at 80° C. for 10 h to obtain the black and blue $Fe_3O_4/SiO_2/K_2Zn[Fe(CN)_6]$ composite adsorbent, wherein the particle size after aggregation is 1.0-5.0 μm according to SEM determination; and when the initial concentration of $Cs^+$ ions in radioactive wastewater is 1-10 mg/L, the adsorption distribution coefficient $K_d$ of the composite adsorbent for $Cs^+$ ions within 1 h reaches $10^4$-$10^7$ mL/g.

Embodiment 4: Preparation of Magnetic Core Coated Copper Potassium Ferrocyanide

A hydrated CuO coating layer is prepared on the surface of $Fe_3O_4/SiO_2$ by using a deposition precipitation method and then a Cu ion stable potassium ferrocyanide adsorbent is prepared. The details of steps are as follows:

1) Dissolve $CuSO_4$, $Cu(NO_3)_2$ or $CuCl_2$ in 100 mL of anhydrous ethanol or isopropanol to enable the concentration of $Cu^{2+}$ to be 0.05-0.06 mol/L. Add 1.0 g of composite magnetic carrier $Fe_3O_4/SiO_2$, and perform ultrasonic dispersion for 30 min. Slowly drop a 0.02-0.05 mol/L NaOH water solution into the reaction system at room temperature, and uniformly stir by using a polytetrafluoroethylene stirrer till the endpoint pH is 7-9. Age at room temperature for 2-4 h, then separate a precipitate by using an external magnetic field, firstly wash with ultra-pure water till the pH is neutral, further wash with anhydrous ethanol for 3-4 times, and dry in a vacuum oven at 80° C. for 10 h to obtain a composite magnetic material $Fe_3O_4/SiO_2/CuO \cdot H_2O$ with the CuO coating amount of 41.6 wt %, wherein the specific saturation magnetization is 46.3 emu/g.

2) Soak 1.0 g of $Fe_3O_4/SiO_2/CuO \cdot H_2O$ composite magnetic material in 50-100 mL of hydrochloric acid solution of potassium ferrocyanide, wherein the concentration of the potassium ferrocyanide is 0.5-1.0 mol/L, and the concentration of the HCl is 1.0 mol/L. React the system at room temperature, stir for 30 min by using the polytetrafluoroethylene stirrer every three hours, separate the precipitate by using the external magnetic field after reacting for 24 h, fully wash the precipitate with ultra-pure water till washing liquid is colorless, further wash with anhydrous ethanol for 2-3 times, and dry the sample in the vacuum oven at 80° C. for 10 h to obtain the black and blue $Fe_3O_4/SiO_2/K_{4-y}Cu_x[Fe(CN)_6]$ composite adsorbent, wherein the particle size after aggregation is 1.0-5.0 μm according to SEM determination; and when the initial concentration of $Cs^+$ ions in radioactive wastewater is 1-10 mg/L, the adsorption distribution coefficient $K_d$ of the composite adsorbent for $Cs^+$ ions within 1 h reaches $10^4$-$10^7$ mL/g.

Embodiment 5: Preparation of Magnetic Core Coated Nickel Potassium Ferrocyanide

A hydrated NiO coating layer is prepared on the surface of $Fe_3O_4/SiO_2$ by using a deposition precipitation method, and then a $Ni^{2+}$ ion stabilized potassium ferrocyanide adsorbent is prepared. The specific steps are as follows:

1) Dissolve $Ni(NO_3)_2$ or $NiSO_4$ in 100 mL of anhydrous ethanol or isopropanol to enable the concentration of $Ni^{2+}$ to be 0.05-0.06 mol/L. Add 1.0 g of composite magnetic carrier $Fe_3O_4/SiO_2$, and perform ultrasonic dispersion for 30 min. Slowly drop a 0.02-0.05 mol/L NaOH water solution into the reaction system at room temperature, and uniformly stir by using a polytetrafluoroethylene stirrer till the endpoint pH is 10-12. Age at room temperature for 2-4 h, then separate a precipitate by using an external magnetic field, firstly wash with ultra-pure water till the pH is neutral, further wash with anhydrous ethanol for 3-4 times, and dry in a vacuum oven at 80° C. for 10 h to obtain a composite magnetic material $Fe_3O_4/SiO_2/NiO \cdot H_2O$ with the NiO coating amount of 45.6 wt %, wherein the specific saturation magnetization is 45.1 emu/g.

2) Soak 1.0 g of $Fe_3O_4/SiO_2/NiO \cdot H_2O$ composite magnetic material in 50-100 mL of hydrochloric acid solution of potassium ferrocyanide, wherein the concentration of the potassium ferrocyanide is 0.5-1.0 mol/L, and the concentration of the HCl is 1.0 mol/L. React the system at room temperature, stir for 30 min by using the polytetrafluoroethylene stirrer every three hours, separate the precipitate by using the external magnetic field after reacting for 24 h, fully wash the precipitate with ultra-pure water till washing liquid is colorless, further wash with anhydrous ethanol for 2-3 times, and dry the sample in the vacuum oven at 80° C. for 10 h to obtain the black and blue $Fe_3O_4/SiO_2/K_{4-y}Ni_x[Fe(CN)_6]$ composite adsorbent, wherein the particle size after aggregation is 1.0-5.0 μm according to SEM determination; and when the initial concentration of $Cs^+$ ions in radioactive wastewater is 1-10 mg/L, the adsorption distribution coefficient $K_d$ of the composite adsorbent for $Cs^+$ ions within 1 h reaches $10^4$-$10^7$ mL/g.

Embodiment 6: Preparation of Magnetic Core Coated Cobalt Potassium Ferrocyanide

A hydrated CoO coating layer is prepared on the surface of $Fe_3O_4/SiO_2$ by using a deposition precipitation method, and then a Co ion stabilized potassium ferrocyanide adsorbent is prepared. The details of steps are as follows:

1) Dissolve $Co(NO_3)_2$ in 100 mL of anhydrous ethanol or isopropanol to enable the concentration of $Co^{2+}$ to be 0.06 mol/L. Add 1.0 g of composite magnetic carrier $Fe_3O_4/SiO_2$, and perform ultrasonic dispersion for 30 min. Slowly drop a 0.02-0.05 mol/L NaOH water solution into the reaction system at room temperature, and uniformly stir by using a polytetrafluoroethylene stirrer till the endpoint pH is 10-12. Age at room temperature for 2-4 h, then separate a precipitate by using an external magnetic field, firstly wash with ultra-pure water till the pH is neutral, further wash with anhydrous ethanol for 3-4 times, and dry in a vacuum oven at 80° C. for 10 h to obtain $Fe_3O_4/SiO_2/CoO \cdot H_2O$ with the CoO coating amount of 44.3 wt %, wherein the specific saturation magnetization is 47.1 emu/g.

2) Soak 1.0 g of $Fe_3O_4/SiO_2/CoO \cdot H_2O$ composite magnetic material in 50-100 mL of hydrochloric acid solution of potassium ferrocyanide, wherein the concentration of the potassium ferrocyanide is 0.5-1.0 mol/L and the concentration of the HCl is 1.0 mol/L. React the system at room temperature, stir for 30 min by using the polytetrafluoroethylene stirrer every three hours, separate the precipitate by using the external magnetic field after reacting for 24 h, fully wash the precipitate with ultra-pure water till flushing liquid is colorless, further wash with anhydrous ethanol for 2-3 times, and dry the sample in the vacuum oven at 80° C. for 10 h to obtain the black and blue $Fe_3O_4/SiO_2/K_{4-y}Co_x[Fe(CN)_6]$ composite adsorbent, wherein the particle size after aggregation is 1.0-5.0 μm according to SEM determination;

and when the initial concentration of $Cs^+$ ions in radioactive wastewater is 1-10 mg/L, the adsorption distribution coefficient $K_d$ of the composite adsorbent for $Cs^+$ ions within 1 h reaches $10^4$-$10^7$ mL/g.

The invention claimed is:

1. A magnetic core coated inorganic ion adsorbent for removing Cs ions in radioactive wastewater, characterized in that the adsorbent takes a composite magnetic carrier $Fe_3O_4/SiO_2$ coated with a dense single layer $SiO_2$ on the surface as a core, a hydrated metal oxide transition layer is coated outside the $Fe_3O_4/SiO_2$, and a ferrocyanide adsorption material layer is coated outside the transition layer; wherein the hydrated metal oxide is $TiO_2 \cdot H_2O$ or $ZrO_2 \cdot H_2O$ or $ZnO \cdot H_2O$ or $CuO \cdot H_2O$ or $NiO \cdot H_2O$ or O $CoO \cdot H_2O$ wherein the coating amount of $TiO_2 \cdot H_2O$ is 50-55 wt. %, and the coating amount of each of other hydrated metal oxides is 40-50 wt. %.

2. The adsorbent according to claim 1, characterized in that the particle size range of the adsorbent is 0.2-5.0 μm, and the specific saturation magnetization is 3-10 emu/g.

3. The adsorbent according to claim 1, characterized in that the specific saturation magnetization of the composite magnetic carrier $Fe_3O_4/SiO_2$ is more than 70 emu/g.

4. The adsorbent according to claim 1, characterized in that the particle size range of the $Fe_3O_4$ in the composite magnetic carrier is 10-60 nm, the specific saturation magnetization is more than 75 emu/g, and the content of organic matters is lower than 1%; and the coating amount of the $SiO_2$ is 4-5wt %.

5. The adsorbent according to claim 1, characterized in that the hydrated metal oxide transition layer is coated outside the single layer $SiO_2$, and the specific saturation magnetization of the obtained composite magnetic material is more than 40 emu/g.

6. A method for preparing the adsorbent according to claim 1, characterized by taking a composite magnetic carrier $Fe_3O_4/SiO_2$ coated with a dense single layer $SiO_2$ on the surface as a core, firstly coating a hydrated metal oxide transition layer on the surface of the composite magnetic carrier, and then coating a ferrocyanide adsorbent layer outside the transition layer wherein the hydrated metal oxide is $TiO_2 \cdot H_2O$ or $ZrO_2 \cdot H_2O$, and the details of steps of the method are as follows:

1) preparing a hydrated titanium oxide or zirconium oxide transition layer by a sol-gel method;
   a) dissolving tetrabutyl titanate in isopropanol, and controlling the volume ratio of the tetrabutyl titanate to the isopropanol at 0.005:1-0.05:1 to form a solution A1 for later use; dissolving zirconium isopropoxide in isopropanol, and controlling the volume ratio of the zirconium isopropoxide to the isopropanol at 0.01:1-0.1:1 to form a solution A2 for later use; and mixing isopropanol with ultra-pure water to form a solution B for later use, wherein the volume ratio of the isopropanol to the water is 5:1-2:1;
   b) adding a composite magnetic carrier $Fe_3O_4/SiO_2$ coated with a dense single layer $SiO_2$ on the surface into the solution B, performing ultrasonic dispersion for 30 min, then adding concentrated ammonia water, and uniformly stirring by using a polytetrafluoroethylene stirrer; and controlling the concentration by mass-to-volume ratio of the $Fe_3O_4/SiO_2$ to the solution B within the range of 0.005-0.02 g/mL and the volume ratio of the concentrated ammonia water to the solution B within the range of 0.02-0.05;
   c1) slowly dropping the solution A1 into the reaction system prepared in the step b) at room temperature, and controlling the amount of tetrabutyl titanate added into per gram of $Fe_3O_4/SiO$ at 2.0-3.0 mL; performing stirring reaction at room temperature for 4-6 h after dropping, separating an obtained precipitate by using an external magnetic field, washing with anhydrous ethanol, and drying in a vacuum oven at 80° C. to obtain a composite magnetic material $Fe_3O_4/SiO_2/TiO_2 \cdot H_2O$ with the surface $TiO_2$ coating amount of 50-55wt % wherein the specific saturation magnetization is more than 40 emu/g;
   c2) under the same operation conditions with c1), slowly dropping the solution A2 into the reaction system prepared in the step b), and controlling the amount of zirconium isopropoxide added into per gram of $Fe_3O_4/SiO_2$ at 1.5-2.5 mL; performing stirring reaction at room temperature for 4-6 h after dropping, separating an obtained precipitate by using an external magnetic field, washing with anhydrous ethanol, and drying in a vacuum oven at 80° C. to obtain a composite magnetic material $Fe_3O_4/SiO_2/ZrO_2$ with the surface $ZrO_2$ coating amount of 40-50 w %, wherein the specific saturation magnetization is more than 40 emu/g;

2) preparing a ferrocyanide adsorbent layer:
   soaking the prepared $Fe_3O_4/SiO_2/TiO_2 \cdot H_2O$ or $Fe_3O_4/SiO_2/ZrO \cdot H_2$ O in a hydrochloric acid solution of potassium ferrocyanide, wherein the concentration of the potassium ferrocyanide is 0.5-1.5 mol/L, the concentration of the hydrochloric acid is 1.0-2.0 mol/L, and the concentration by mass-to-volume ratio of the $Fe_3O_4SiO_2/TiO_2H_2O$ or $Fe_3O_4/SiO_2/ZrO_2 \cdot H_2O$ is 0.01-0.03 g/mL; reacting the system at room temperature,
   stirring for 30 min every 2-4 h,
   separating the precipitate by using the external magnetic field after reacting for 20-24 h,
   fully washing the precipitate with ultra-pure water till flushing liquid is colorless,
   further washing with anhydrous ethanol,
   and drying in the vacuum oven at 80° C. to obtain the required black and blue magnetic core coated composite adsorbent.

7. A method for preparing the adsorbent according to claim 1, characterized b taking a composite magnetic carrier $Fe_3O_4/SiO_2$ coated with a dense single layer $SiO_2$ on the core, firstly coating a metal oxide transition layer on the surface of the composite magnetic carrier, and then coating a ferrocyanide adsorbent layer outside the transition layer characterized in that the hydrated metal oxide is $MO-H_2O$, wherein M is one of Co, Ni, Cu or Zn, and the details of steps of the method are as follows:

1) Preparing a hydrated copper oxide, zinc oxide, nickel oxide or cobalt oxide transition layer by adopting a surface deposition precipitation method;
   a) dissolving a soluble sulfate, acetate, nitrate or chloride of the metal M in 100mL of anhydrous ethanol or isopropanol to form a solution CM, wherein M is one of Co, Ni, Cu and Zn, and the molar concentration of metal M ions is controlled within the range of 0.04-0.06 mol/L;
   b) adding the composite magnetic carrier $Fe_3O_4/SiO_2$ coated with the dense single layer $SiO_2$ on the surface, and performing ultrasonic dispersion for 30 min, wherein the concentration by mass-to-volume ratio of the $Fe_3O_4/SiO_2$ is controlled within the range of 0.005-0.015 g/mL;

c) slowly dropping a 0.02-0.05 mol/L NaOH water solution into the reaction system prepared in the step e) at room temperature, uniformly stirring by using the polytetrafluoroethylene stirrer, controlling endpoint pHs as follows respectively: Zn: 6.5-8; Cu: 7-9 and Ni/Co: 10-12 to realize complete deposition of the ions on the surface of the $Fe_3O_4/SiO_2$; and aging the reaction system for 2-4 h at room temperature after titration, then separating the precipitate by using the external magnetic field, firstly washing with ultra-pure water till the pH is neutral, further washing with anhydrous ethanol, and drying the $Fe_3O_4/SiO_2$ in the vacuum oven to obtain a composite magnetic material $Fe_3O_4/SiO_2/MO\cdot H_2O$ with the surface coating amount of 40-50 wt %, wherein the specific saturation magnetization is more than 40 emu/g;

2) preparing a ferrocyanide adsorbent layer:

soaking the prepared $Fe_3O_4/SiO_2/MO\cdot H_2O$ in a hydrochloric acid solution of potassium ferrocyanide, wherein the concentration of the potassium ferrocyanide is 0.5-1.5 mol/L, the concentration of the hydrochloric acid is 1.0-2.0 mol/L, and the concentration by mass-to-volume ratio of the $Fe_3O_4/SiO_2/MO\cdot H_2O$ is 0.01-0.03 g/mL;

reacting the system at room temperature, stirring for 30 min every 2-4 h, separating the precipitate by using the external magnetic field after reacting for 20-24 h, fully washing the precipitate with ultra- pure water till flushing liquid is colorless, further washing with anhydrous ethanol, and drying in the vacuum oven at 80° C. to obtain the required black and blue magnetic core coated composite adsorbent.

8. The method according to claim 6, characterized in that the particle size of the composite adsorbent is 0.2-5 μm, the specific saturation magnetization is 3-10 emu/g, and when the initial concentration of $Cs^+$ ions in radioactive wastewater is 1-10 mg/L and the concentration of competing ions $H^+$, $Na^+$ and $K^+$ is 0.1-1.0 mol/L, the adsorption distribution coefficient of the composite adsorbent for $Cs^+$ is as follows: $K_d=10^4-10^7$ mL/g, and the adsorption selectivity coefficients for $Cs^+$ are as follows: respectively: $Ks_{Cs/H}=10^3-10^6$, $Ks_{CsNa}=10^3-10^5$ and $K_{Cs/K}=10^3-10^4$.

9. The method according to claim 8, characterized in that the resistivity of ultra-pure water is not lower than 16 MΩ·cm.

10. The method according to claim 7, characterized in that the particle size of the composite adsorbent is 0.2-5 μm, the specific saturation magnetization is 3-10 emu/g, and when the initial concentration of $Cs^+$ ions in radioactive wastewater is 1-10 mg/L and the concentration of competing ions $H^+$, $Na^+$ and $K^+$ is 0.1-1.0 mol/L, the adsorption distribution coefficient of the composite adsorbent for $Cs^+$ is as follows: $K_d=10^4-10^7$ mL/g, and the adsorption selectivity coefficients for $Cs^+$ are as follows respectively: $Ks_{Cs/H}=10^3-10^6$, $Ks_{Cs/Na}=10^3-10^5$ and $Ks_{Cs/K}=10^3-10^4$.

* * * * *